United States Patent [19]

Deuk Ik et al.

[11] Patent Number: 5,584,437
[45] Date of Patent: Dec. 17, 1996

[54] AIR FLOW CONTROL APPARATUS IN AN AIR CONDITIONER

[75] Inventors: Ji Deuk Ik; Kim Jong Youb, both of Suwon, Rep. of Korea

[73] Assignee: Samsung Electronics Co., Ltd., Suwon, Rep. of Korea

[21] Appl. No.: 240,625

[22] Filed: May 11, 1994

[30] Foreign Application Priority Data

May 31, 1993 [KR] Rep. of Korea ................. 93-9709

[51] Int. Cl.$^6$ ................................... F28F 27/02
[52] U.S. Cl. ................. 165/294; 62/186; 236/78 B; 165/124; 165/100; 165/296
[58] Field of Search .................. 236/78 B; 62/186, 62/152, 105, 97, 179, 178; 165/34, 96, 39, 40, 124, 100

[56] References Cited

U.S. PATENT DOCUMENTS

| 2,189,888 | 2/1940 | Endsley | 165/34 |
| 3,565,164 | 2/1971 | Kline | 165/39 |
| 3,692,096 | 9/1972 | Pettersson et al. | 165/34 |
| 4,177,861 | 12/1979 | Costello et al. | 165/34 |
| 5,036,676 | 8/1991 | Dudley | 62/186 |
| 5,097,890 | 3/1992 | Nakao | 165/39 |
| 5,127,576 | 7/1992 | Weatherhead et al. | 236/78 B |
| 5,385,030 | 1/1995 | Kitagawa et al. | 62/186 |

FOREIGN PATENT DOCUMENTS

| 1045729 | 12/1953 | France | 123/41.05 |
| 2483054 | 11/1981 | France | 62/186 |
| 0019541 | 2/1982 | Japan | 62/186 |
| 0130925 | 8/1983 | Japan | 236/78 B |
| WO84/03138 | 8/1984 | Japan | 62/152 |

*Primary Examiner*—John K. Ford
*Attorney, Agent, or Firm*—Burns, Doane, Swecker & Mathis, L.L.P.

[57] ABSTRACT

An air conditioner comprises a heat exchanger for conducting refrigerant in heat exchanging relationship with an air flow, and a blower for drawing air through the heat exchanger. An adjustable flow distributing plate is disposed between the heat exchanger and blower and is movable by a motor to various positions for controlling the relative air flows through respective portions of the heat exchanger. Temperature sensors are connected to the heat exchanger for detecting the refrigerant temperature at various regions of the heat exchanger. The adjustable plate is positioned in a desired position in response to the detected refrigerant temperatures for equalizing the refrigerant temperatures in the regions of the heat exchanger.

4 Claims, 5 Drawing Sheets

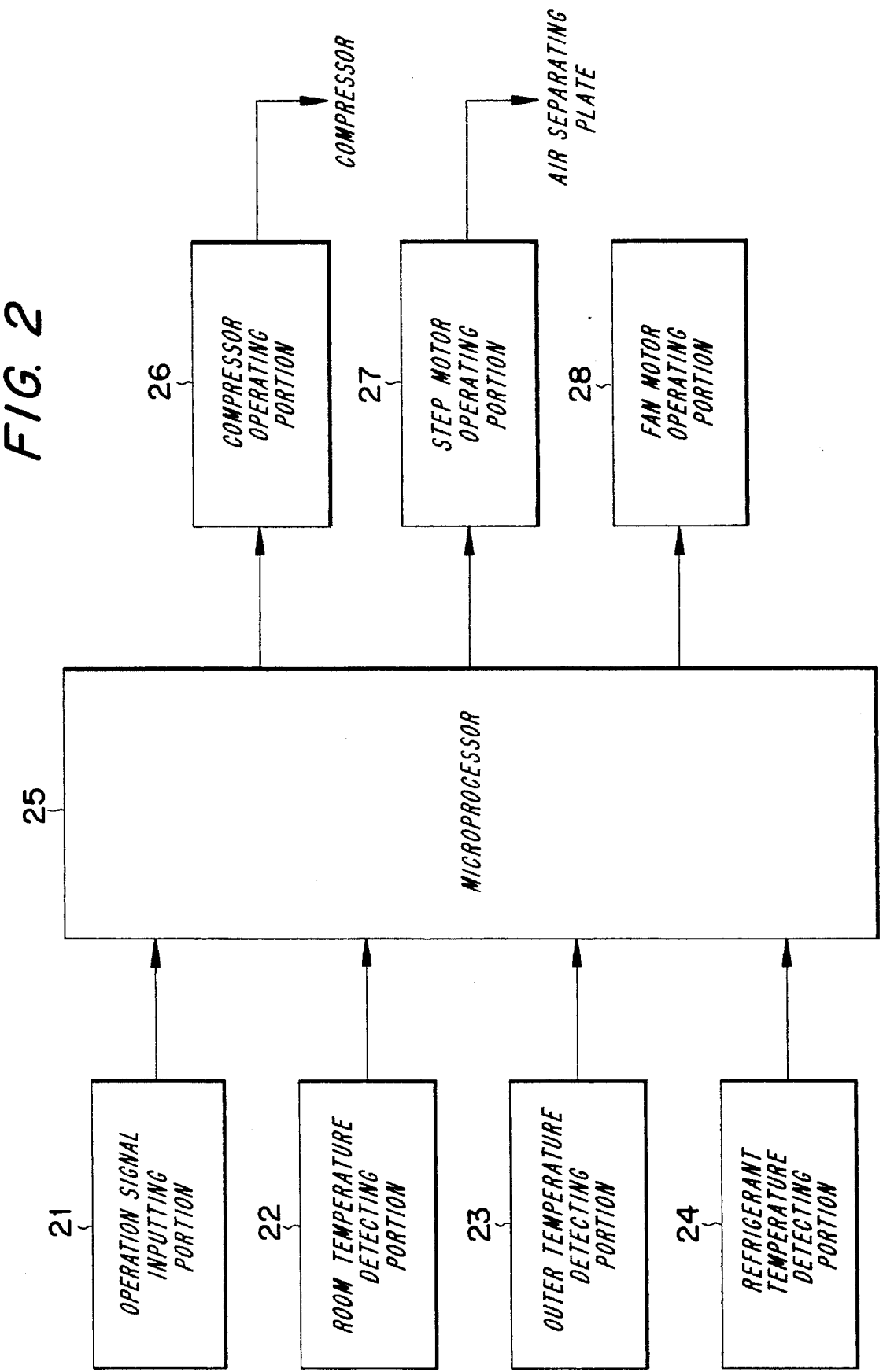

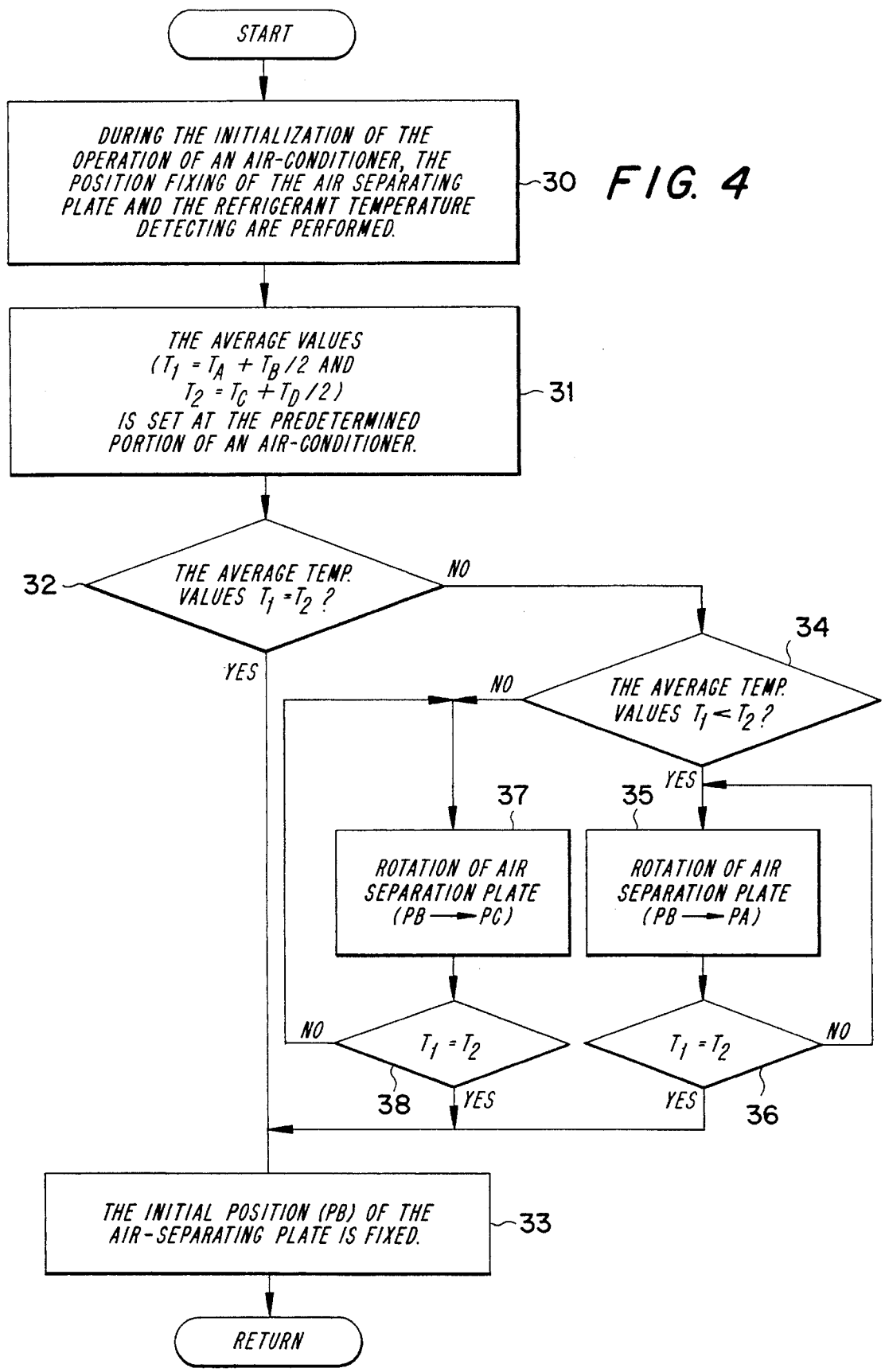

AIR FLOW CONTROL APPARATUS IN AN AIR CONDITIONER

TECHNICAL FIELD

The invention is related to providing an air flow control apparatus and method for an air conditioner, and in particular, to providing an air flow control apparatus and method in an air conditioner for varying the air flow at the outlet side of the refrigerant of a heat-exchanger.

PRIOR ART

The indoor unit of a conventional multi-unit air-conditioner includes a blower fan and a heat-exchanger which are usually often placed at an irregular interval from each other. In other words, when air passes through the heat-exchanger, the air flow rate through the portion near the fan motor (the upper portion of the heat-exchanger) is greater than the air flow rate through another portion farther away from the fan motor (the lower portion of the heat-exchanger). This causes the heat-exchange function to be performed in an inconsistent manner throughout the heat-exchanger, whereby the heat-exchanging efficiency is decreased to a large degree and the cooling capability is significantly reduced.

In order to resolve these problems, a typical example is Japan Laid-Open Utility Model No. Sho 57-153916 as shown in FIG. 5. The indoor unit comprises a housing 51, a blower fan 52, a heat-exchange coil 53, a drain pan 54, an air flow passage 50, an air flow directing and noise suppressing piece 56, an air flow directing and noise suppressing plate 57 and a supporting shaft 58. The air flow directing and noise suppressing piece 56 installed at an intermediate portion of the air flow passage 50 to enable its angle, direction and position to be freely changed and adjusted, and the air flow directing and noise suppressing plate 57 is shaped like a curved mountain ridge and is mounted at the rear wall of the unit housing so that it can be freely moved upward and downward, thereby adjusting the air current direction and the air flow rate from the blower 52.

The utility model discloses that the air current and the air flow rate from the blower 52 to the heat-exchanger 53 are adjusted by the air flow directing and noise suppressing piece 56 and the air flow directing and noise suppressing plate 57, but it fails to adjust the air current and the air flow rate in accordance with the temperature at any portion of the heat-exchanger 53, and thus the air flow rate passing through the heat-exchanger 53 cannot be uniformly controlled.

Accordingly, it is an object of the invention to provide an apparatus and method for automatically controlling the air current and the air flow rate passing through any portion of the heat-exchanger 53.

Another object of the invention is to provide an apparatus and method for varying an air flow passage in accordance with the temperatures of the refrigerant detected at each portion of the heat-exchanger.

Another object of the invention is to provide an apparatus and method for uniformly the heat-exchanging the air at every portion of the heat-exchanger.

SUMMARY OF THE INVENTION

In order to accomplish these objects, an air flow control apparatus of the invention comprises a plurality of sensors mounted on the heat-exchanger to detect the temperature of the refrigerant, an air separating plate mounted on the lower portion of the air blowing apparatus which intakes and discharges cooled air from the heat-exchanger and for varying the air flow, a control portion for receiving temperature data from the sensors and processing the temperature data to transmit a control signal and a step motor portion for rotating the air separating plate in accordance with the control signal.

Also, an air flow control method of the invention comprises steps of: setting the air separating plate at the initial position, detecting the temperature of the refrigerant at various portions of the heat-exchanger, calculating the average value of the detected temperatures corresponding to the upper portion and lower portion of the heat-exchanger, comparing these two average values with each other and controlling the air separating plate in order to control the air flow in accordance with the comparison result.

BRIEF DESCRIPTION OF THE DRAWINGS

The invention will now be described in detail with reference to the accompanying drawings, in which:

FIG. 2 is a schematic block diagram illustrating an air flow control apparatus according to the invention;

FIG. 4 is a flow chart illustrating an air flow control method according to the invention; and, FIG. 5 is a cross-sectional view illustrating an indoor unit of the prior art.

DETAILED DESCRIPTION OF THE PREFERRED EMBODIMENT

Figure 1A:
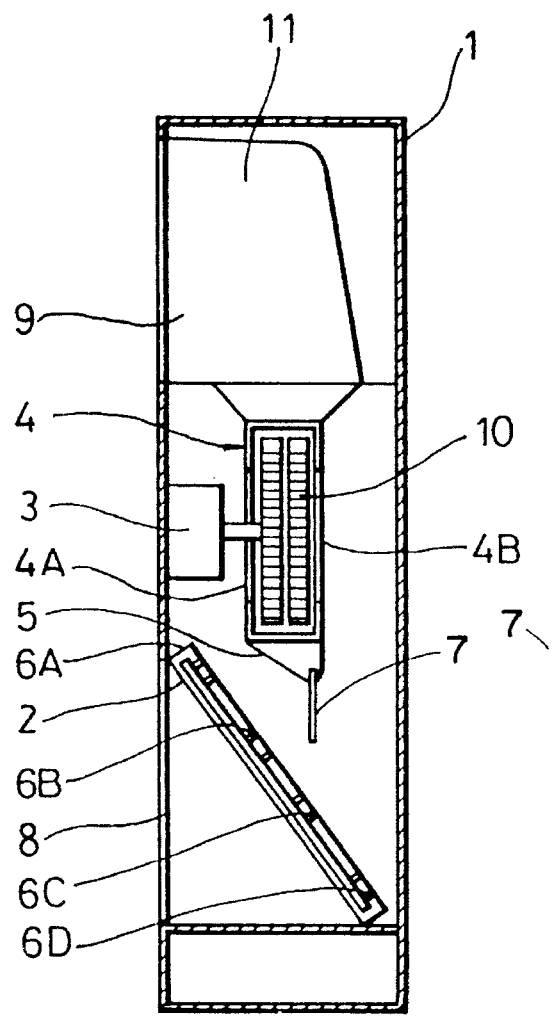
FIG. 1A is a longitudinal cross-sectional view and FIG. 1B is a front view illustrating an indoor unit to which the invention is adapted.
Figure 1B:
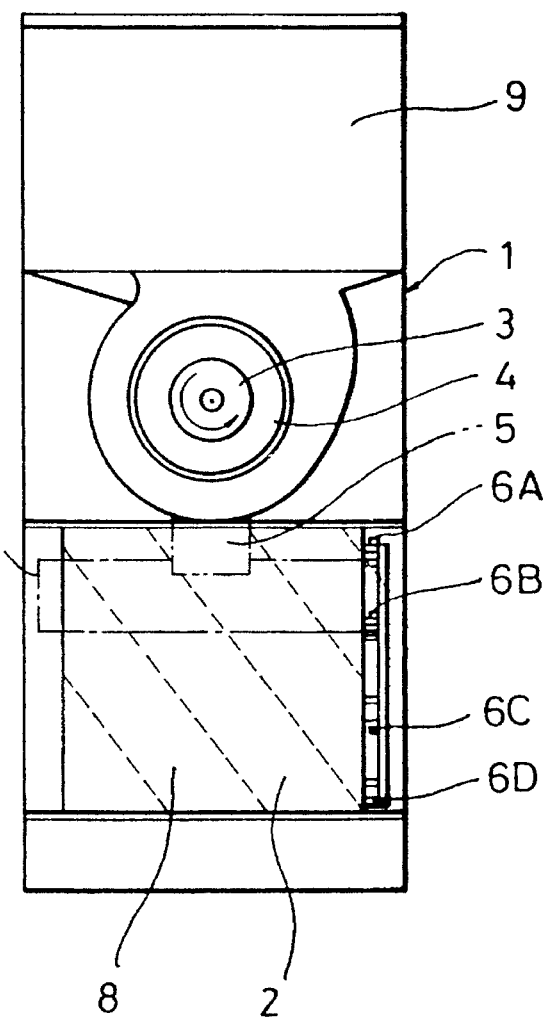

FIG. 1A and 1B respectively show a longitudinal cross-sectional view and a front view of an indoor unit of an air-conditioner according to the invention.

An indoor unit 1 includes a heat-exchanger 2 for exchanging heat with the intake air. A fan motor 3 is electrically connected to a power source so that it can be rotated. A blowing apparatus 4 is attached by a shaft to the fan motor 3 to be rotated by the driving force thereof, so that intake air from inlets 4A and 4B of the fan housing is discharged into the indoor living space through an outlet 9 and a duct 11.

A plurality of sensors 6A to 6D air are fixed at predetermined positions in the heat-exchanger 2 at the discharging side of the air flow in order to detect the temperature of the refrigerant. The sensors are arranged at equal intervals whereby the temperature sensor 6A is located on the upper portion of the heat-exchanger 2, and the temperature sensor 6D is located on the lower portion of the heat-exchanger 2. The arrangement of the temperature sensors cannot limit the scope of the invention because the diagonal arrangement or other patterns can be utilized, if necessary.

An air separating or distributing plate 7 is mounted to the lower portion of a step motor 5 to vary the air flow passing heat-exchanged air. The step motor 5 receives a control signal from a microprocessor 25 (as illustrated in FIG. 2) to rotate the air separating plate 7 upwards or downwards.

FIG. 2 is a schematic block diagram of an air flow control apparatus according to the invention to which the invention is applied.

The microprocessor 25 includes an operation signal inputting portion 21 for inputting instruction signals for the operation of the air-conditioner, a room temperature detecting portion 22 for detecting the room temperature during the operation of the air-conditioner, an outdoor temperature detecting portion 23 for detecting the outdoor temperature during the operation of the air-conditioner, a refrigerant temperature detecting portion 24 including the plurality of sensors 6A to 6D mounted at predetermined positions to detect the temperature of the refrigerant during the operation of the air-conditioner. Thus, the microprocessor 25 receives signals from the operation signal inputting portion 21, the room temperature detecting portion 22, the outdoor temperature detecting portion 23, and the refrigerant temperature detecting portion 24 and then processes those signals according to the system programming and then outputs control signals to its peripheral apparatus. For example, a compressor operating portion 26 control the operation of a compressor according to the control signals. A step motor operating portion 27 rotates the air separating plate 7 so as to vary the air flow according to the control signals. A fan motor operating portion 28 controls the operation of the fan motor 3 constituted as a part of an air circulating apparatus according to the control signals.

FIG. 3 shows the operational states of the air separating plate 7 according to an air flow control apparatus and method of the invention.

As shown in FIG. 3, the air separating plate 7 varies the air flow by being rotated with reference to the initial fixing position PB. In other words, the air flow current direction and the flow rate are altered to positions depicted in FIGS. 3B–3F.

Therefore, the air flow passage control will be described as follows:

The indoor unit 1 is provided with the heat-exchanger 2, for example an evaporator, constituted as a part of the cooling cycle system, and an associated control apparatus (omitted from the drawing) properly installed therein. The indoor unit 1 is installed in the living space to draw in and discharge air, in a manner that the heat-exchanger 2 exchanges heat with the air drawn in through air inlet portion 8 which is formed in the lower portion of the indoor unit 1. Each of the refrigerant temperature sensors 6A to 6D, arranged at equal intervals on the discharging surface of the heat-exchanger 2 detects the refrigerant temperature and this data is then transmitted to the microprocessor 25. The microprocessor 25 processes the detected temperature signals to control the rotation of the air separating plate 7 so as to vary the air flow as shown in FIG. 3A–3F.

In accordance with the formulas shown below, the microprocessor 25 calculates the average value $T_1$ of the temperatures $T_A$ and $T_B$ detected by the refrigerant temperature sensors 6A and 6B and the average value $T_2$ of the temperatures $T_C$ and $T_D$ detected by the refrigerant temperature sensors 6C and 6D, compares the two average values to each other and then determines the rotation angle of the air separating plate 7.

$$T_1=T_A+T_B/2,\ T_2=T_C+T_D/2$$

The microprocessor 25 transmits a control signal corresponding to the rotation angle of the air separating plate 7 to the step motor operating portion 27, thereby operating the step motor 5 and rotating the air separating plate 7.

The air blowing apparatus 4 includes the fan motor and air suction inlets 4A and 4B formed on the left and right sides of its housing, said housing mounted in the middle portion of the indoor unit. Therefore, the rotation of the air blowing fan 10 connected to the fan motor under the control of the microprocessor 25 introduces air through the heat-exchanger 2 into the air blowing apparatus 4 through the air suction inlets 4A and 4B. The air blowing apparatus 4 discharges air through duct 11 and the air outlet 9 into the living space.

FIG. 4 is a flow chart illustrating an air flow control method of the invention.

Figure 3A:
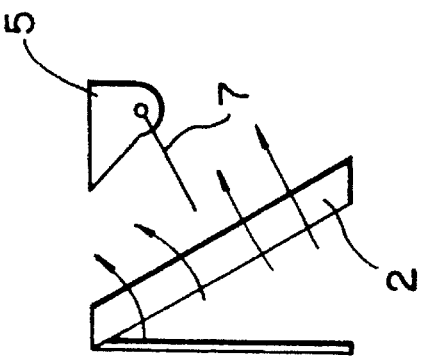
FIG. 3A–3F are views illustrating the operation of the air flow control apparatus according to the principle of the invention.
Figure 3B:
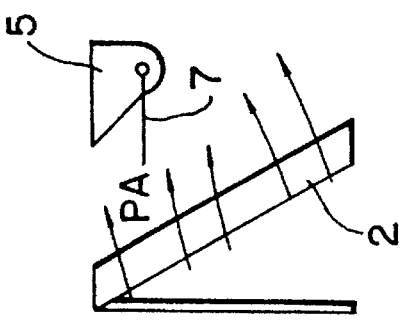
Figure 3C:
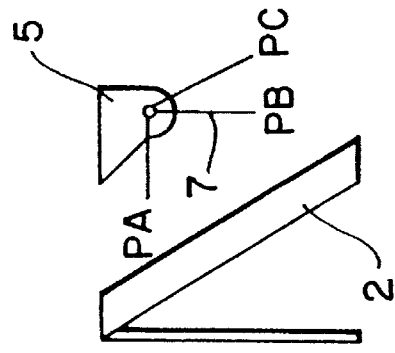
Figure 3D:
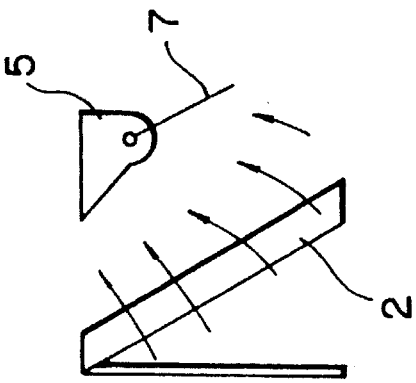
Figure 3E:
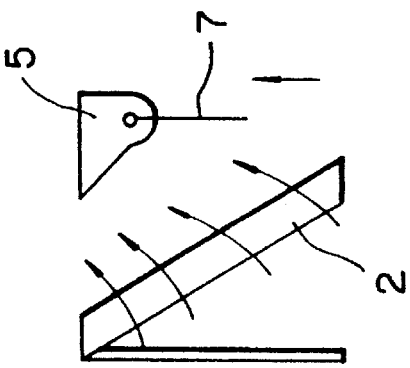
Figure 3F:
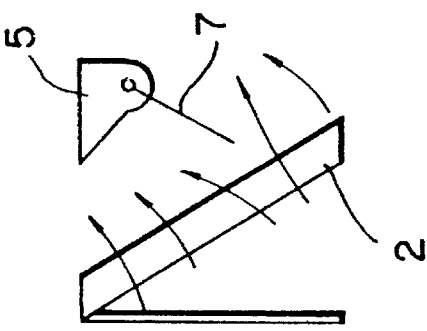
Figure 5:
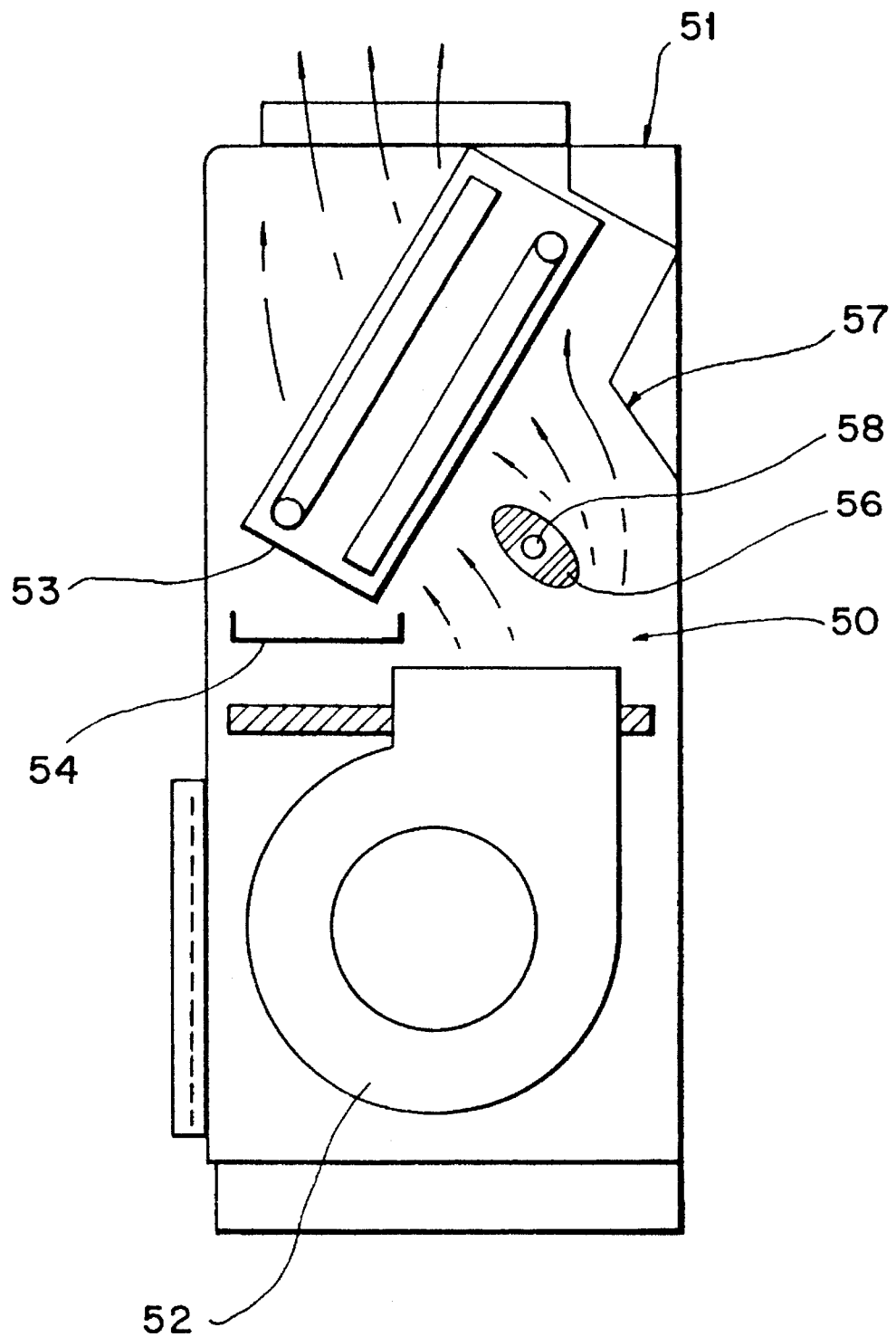

When the power source is applied to the air conditioner, the microprocessor 25 performs an initial process which is common in most air-conditioners. Thus, an explanation of the process is omitted herein because it is not the invention. The air separating plate 7 is vertically fixed at the initial position as shown in FIG. 1 and FIG. 3A and 3E.

The microprocessor 25 receives the equipment operator's instruction signals for the operation of the air conditioner from an operation signal inputting portion 21. Also, the microprocessor 25 processes the input signals and the temperature signals obtained from room temperature detecting portion 22 and outdoor temperature detecting portion 23 according to the system program and transmits the control signals to compressor operating portion 26 and fan motor operating portion 28, so that a compressor (not shown) and the air blowing apparatus 4 are operated to enable the indoor unit 1 to air-condition the living space.

At this time, air passing through the portion of the heat-exchanger 2 located near the air blowing apparatus 4 is rapidly discharged, while air passing through the portion of the heat-exchanger located distant from the blowing apparatus 4 is discharged at a relatively slower speed. This causes differences in the amount of heat-exchanged at each part of the heat-exchanger 2. Thus, the temperature of the portion generating a relatively larger amount of heat-exchanged air is higher than that of the portion generating a relatively smaller amount of heat-exchanged air.

Accordingly, step 30 is performed in a manner whereby the air separating plate 7 is vertically disposed. The four temperature sensors 6A to 6D are electrically connected to the refrigerant temperature detecting portion 24 to detect the refrigerant temperatures at predetermined portions of the heat-exchanger 2 during its operation to enable the refrigerant temperature detecting portion 24 to supply the detected temperature signals to the microprocessor 25.

Step 30 proceeds to step 31 in order to cause the microprocessor 25 to calculate the average temperature value $(T_1=T_A+T_B/2)$ of the upper portion of the heat-exchanger and the average temperature value $(T_2=T_C+T_D/2)$ of the lower portion thereof by the refrigerant temperature sensors 6A and 6B and the refrigerant temperature sensors 6C and 6D, respectively.

Step 31 proceeds to step 32 to determine whether the average temperature values $T_1$ and $T_2$ are equal to each other. If the average temperature values $T_1$ and $T_2$ are equal to each other, the microprocessor 25 calculates the uniform refrigerant temperature distribution at the predetermined portions of the heat-exchanger 2 and does not attempt the change of the air flow rate and the air flow current. The system control proceeds to step 33, leaving the air separating plate 7 fixed at the vertical position PB as shown in FIG. 1 and FIG. 3A and 3E.

Conversely, if the average temperature values $T_1$ and $T_2$ are not equal to each other, step 32 proceeds to step 34 to determine whether the average temperature value $T_2$ of the lower heat-exchanger portion is larger than the average temperature value $T_1$ of the upper heat-exchanger portion. If the lower portion's average temperature value $T_2$ is larger than the upper portion's average temperature value $T_1$, this refrigerant temperature distribution in the heat-exchanger 2 means that the upper portion has a smaller flow rate of heat-exchanged air than the lower portion. Therefore, in order to increase the air flow rate passing through the upper portion, step 34 goes to step 35 in order to rotate the air separating plate 7 upward by a step from the initial vertical position PB as shown in FIG. 3D.

Next, at step 36, the microprocessor 25 receives the current refrigerant temperature signals detected by the four temperature sensors 6A to 6D of the refrigerant temperature detecting portion 24 to determine whether the upper and lower average temperature values $T_1$ and $T_2$ are equal to each other. If the average temperature values $T_1$ and $T_2$ are not equal to each other, step 35 is repeated to rotate the air separating plate 7 upward by another step (FIG. 3C), and so on, until the upper and lower average temperature values, $T_1$ and $T_2$ respectively, are the same.

Subsequently, if at step 36 the average temperature values $T_1$ and $T_2$ are equal to each other, the system control proceeds to step 33 whereby the air separating plate 7 is fixed at the vertical position PB.

If, the step 34, $T_2$ is not greater than $T_1$, then the operation proceeds to steps 37 and 38 where the plate 7 is rotated toward position PC (by plural steps if necessary).

As described above, the invention enables a heat-exchanger to heat-exchange air at numerous portions, thereby improving the operating efficiency of the heat-exchanger and increasing the air-conditioning efficiency.

The invention describes the arrangement of a plurality of temperature sensors in the up and down directions, but it is noted that a diagonal and longitudinal arrangement of sensors falls within the scope of the invention.

What is claimed is:

1. An air conditioner comprising:

a heat-exchanger for conducting refrigerant in heat exchanging relationship with an air flow passing through an air flow passage formed by the heat exchanger;

an air blower for generating the air flow through the air flow passage; and a mechanism for substantially equalizing the refrigerant temperatures in respective portions of the heat exchanger, comprising:

an air distributing plate disposable in various states of adjustment for varying the air flow distribution along the air flow passage, a motor connected to the air distributing plate for changing the state of adjustment of the air distributing plate, temperature sensors for detecting refrigerant temperatures in the respective portions of the heat exchanger, and a controller connected to the temperature sensors and the motor for detecting differences in the refrigerant temperature in the respective heat exchanger portions, and for actuating the motor to change the state of adjustment of the air distributing member to increase the air flow to the heat exchanger portion having a lower refrigerant temperature and reduce the air flow to the heat exchanger portion having a higher refrigerant temperature.

2. The air conditions according to claim 1, wherein the air blower is situated downstream of the heat exchanger, and the air distributing member is situated between the heat exchanger and the air blower.

3. The air conditioner according to claim 1, wherein the air distributing plate is pivoted at one of its ends.

4. The air conditioner according to claim 1, wherein the heat exchanger includes upper and lower ends, the temperature sensors being spaced at substantially equal intervals from the upper end to the lower end of the heat-exchanger.

* * * * *